July 15, 1958

A. M. DE GAETA ET AL 2,843,724

ELECTRIC WELDING METHOD

Filed Oct. 10, 1955

INVENTOR.

BY

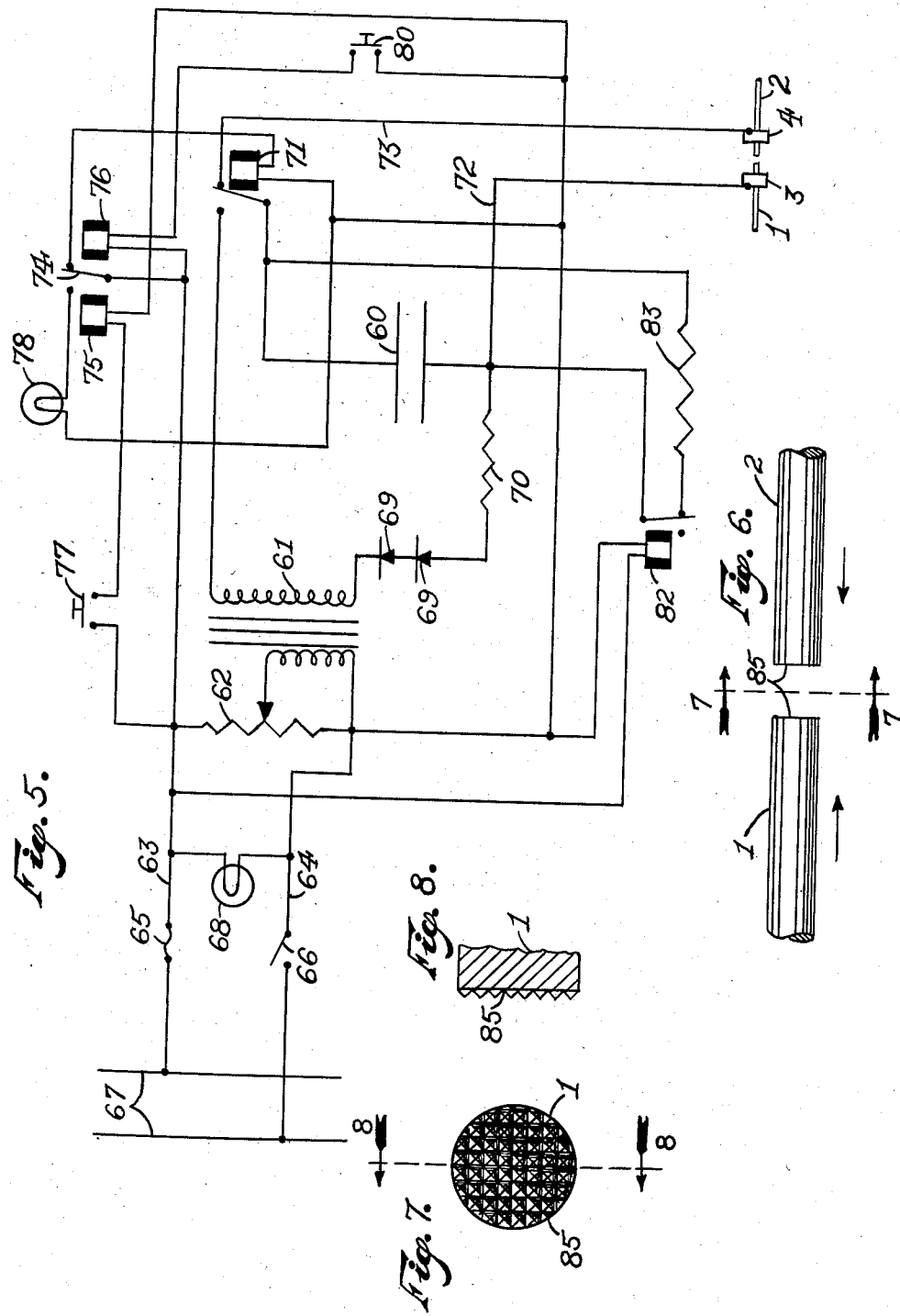

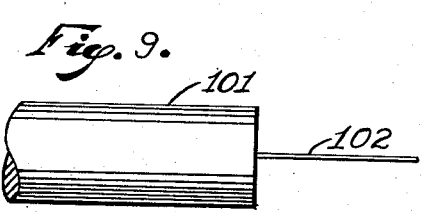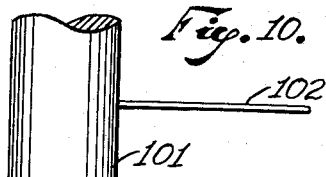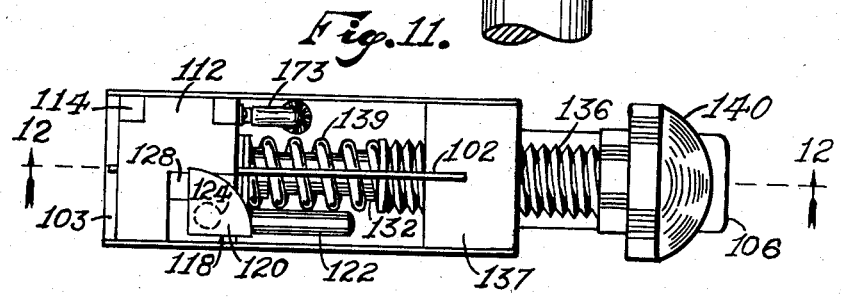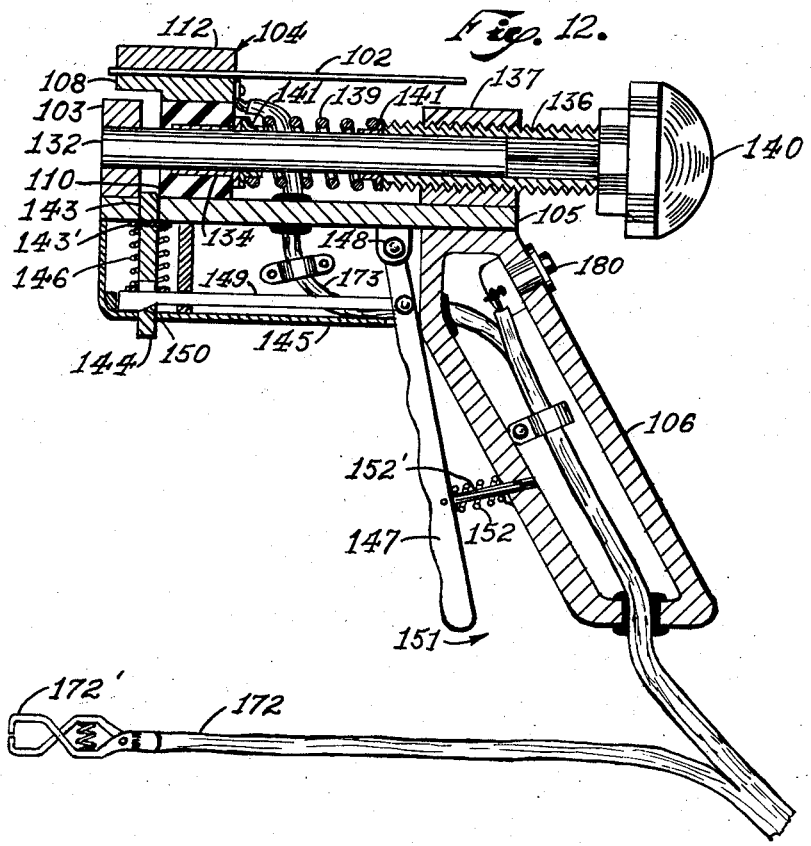

United States Patent Office 2,843,724
Patented July 15, 1958

2,843,724

ELECTRIC WELDING METHOD

Albert M. De Gaeta, Brooklyn, N. Y., and Frank W. Klimm, Maywood, N. J.

Application October 10, 1955, Serial No. 539,475

13 Claims. (Cl. 219—96)

The present invention relates to a method and apparatus for effecting electro-percussive butt welding and is particularly suitable for welding two wires end to end or welding the end of a wire to a member of larger cross section.

Electro-percussive welding is effected by connecting the wires or other members to be welded to opposite terminals of an electrical condenser and then bringing the wires together in end to end relation so that the condenser discharges through the wires and heats the ends of the wires to effect a weld. In a known method of electro-percussive welding, the condenser is charged to a sufficiently high voltage, for example 1,000 volts or more, to produce an arc between the wires and thereby melt the end portions before any physical contact between the wires takes place. This method requires the use of more expensive high voltage condensers and excludes the utilization of common electrolytic condensers which have a maximum voltage rating of about 440 volts. The higher voltage also creates an accident hazard. Even if the apparatus itself is enclosed and properly insulated, the hazard still exists since the voltage is applied to the wires which are to be welded. As these wires normally extend outside the apparatus and cannot conveniently be isolated, the high voltage creates a shock hazard.

In another known method of electro-percussive welding, the ends of wires to be welded are first brought into contact and then pulled apart to strike an arc, the ends of the wires being thereafter again brought together to effect a weld. All of this must be done in a short period of time, for example a small fraction of a second with the result that relatively heavy, complex and expensive equipment is required to carry out the method. Still other methods employ inductance in the condenser discharge circuit for the purpose of setting up oscillations to produce a series of successive arcs between the wire ends. Unless larger condensers are used to store more energy, this protraction of the welding cycle results in less intense and less efficient heating of the wire ends and results in failure to produce satisfactory welds.

It is an object of the invention to provide electropercussive welding apparatus that is safer, simpler, lighter weight, less expensive and more efficient. Greater safety is achieved by using lower voltage and by means of safety controls that will be described more fully below. The low voltage also permits the use of commercial electrolytic condensers, which are inexpensive and dependable. The efficient utilization of energy in accordance with the invention avoids the need of large condensers even though the voltage used is relatively low—not exceeding 450 volts. The size, weight and cost of the equipment are kept low by the use of relatively small low voltage condensers and by the use of smaller and less expensive insulators permitted by the lower voltage. The relative simplicity of the apparatus further decreases its size and cost while at the same time assuring dependable operation.

The invention further provides an improved method of welding which by reason of its efficiency and effectiveness has been found to produce highly satisfactory welds with relatively low voltage and low energy requirements.

The nature, objects and advantages of the invention will appear more fully from the following description and claims in conjunction with the accompanying drawings which illustrate by way of example preferred embodiments of the invention and in which Fig. 1 is a plan of welding apparatus in accordance with the invention.

Fig. 5 is a wiring diagram of the electrical system of the welding apparatus.

Fig. 6 is an enlarged schematic view showing end portions of two wires to be welded.

Fig. 7 is an enlarged end view of one of the wires taken on the line 7—7 in Fig. 6.

Fig. 8 is a fragmentary section on the line 8—8 in Fig. 7.

Figs. 9 and 10 are fragmentary views illustrating the butt welding of a smaller wire to a larger wire or rod.

Fig. 11 is a plan of another embodiment of the invention intended for welding a small wire to a larger member as illustrated in Figs. 9 and 10.

Fig. 12 is a longitudinal section taken approximately on the line 12—12 in Fig. 11.

Apparatus

Figure 2:
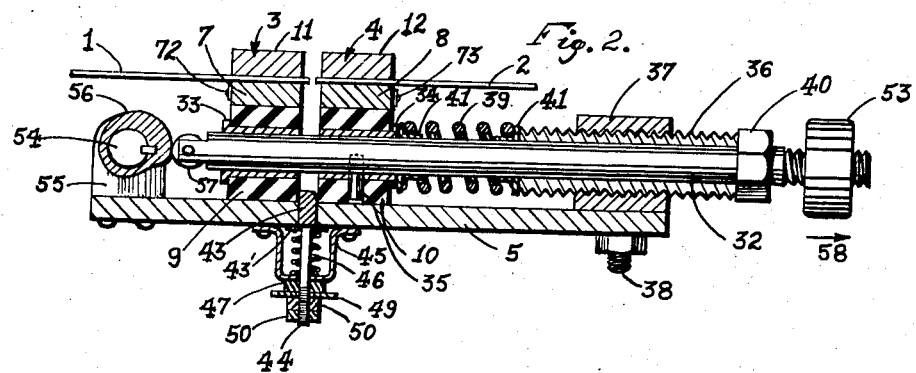
Fig. 2 is a longitudinal section taken approximately on the line 2—2 of Fig. 1.
Figure 3:
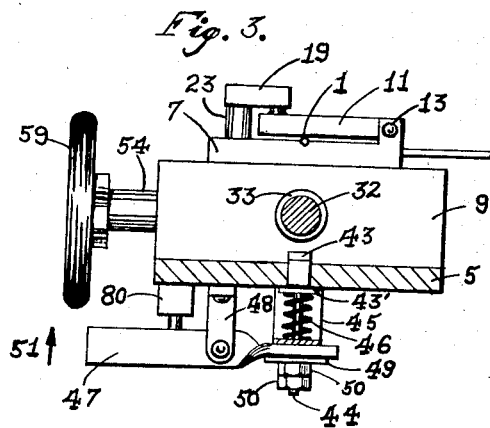
Fig. 3 is a transverse section taken approximately on the line 3—3 in Fig. 1.
Figure 4:
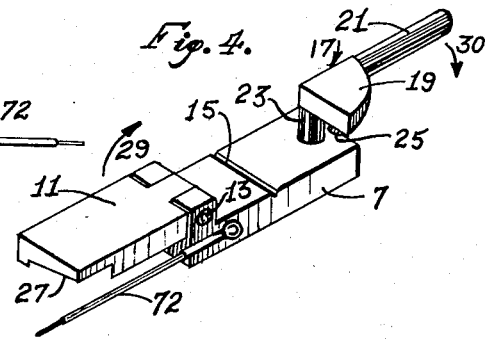
Fig. 4 is a schematic perspective view showing in open position one of the clamps for holding wire to be welded.

In the apparatus illustrated by way of example in Figs. 1 to 4, wires 1 and 2 that are to be welded together in end to end relation are held respectively by a fixed clamp 3 and movable clamp 4 both mounted on a suitable frame or base 5. The two clamps 3 and 4 are alike and each comprises a lower jaw 7, 8 fixedly mounted on an insulating block 9, 10 and an upper jaw 11, 12 swingably connected to the lower jaw by a hinge mounting 13—14. The upper face of each of the lower jaws 7, 8 is preferably provided with one or more transversely extending grooves 15 as illustrated in Fig. 4 the grooves of the two clamp units being aligned with one another. When different sized wires are to be welded, the grooves 15 are preferably of different sizes to receive the respective wires. The upper jaw of each clamp unit is swingable from the open position shown in Fig. 4 to the closed position shown in Figs. 1, 2 and 3 and is held in closed position by means of a quick acting locking device 17, 18 shown as comprising a segmental latch member 19, 20 swingable by means of a handle 21—22 on a pivot post 23, 24 projecting upwardly from the lower jaw 7, 8 adjacent the end opposite the hinge 13, 14. The segmental member 19, 20 carries on its lower face a downwardly projecting protuberance or ball 25 which engages a cam surface 27, 28 provided on the upper face of the upper jaw 11, 12 at the end opposite the hinge. A wire to be welded is positioned in a groove 15 of the lower jaw and the upper jaw 11 is swung in the direction indicated by the arrow 29 (Fig. 4) to closed position in which it overlies the lower jaw 7 and engages the wire. The handle 22 is then swung in the direction of the arrow 30 causing the ball portion 25 on the pivotally mounted latch member 19 to engage the sloping cam surface 27 and thereby press the upper jaw downwardly to clamp the wire tightly between the two jaws.

Figure 1:
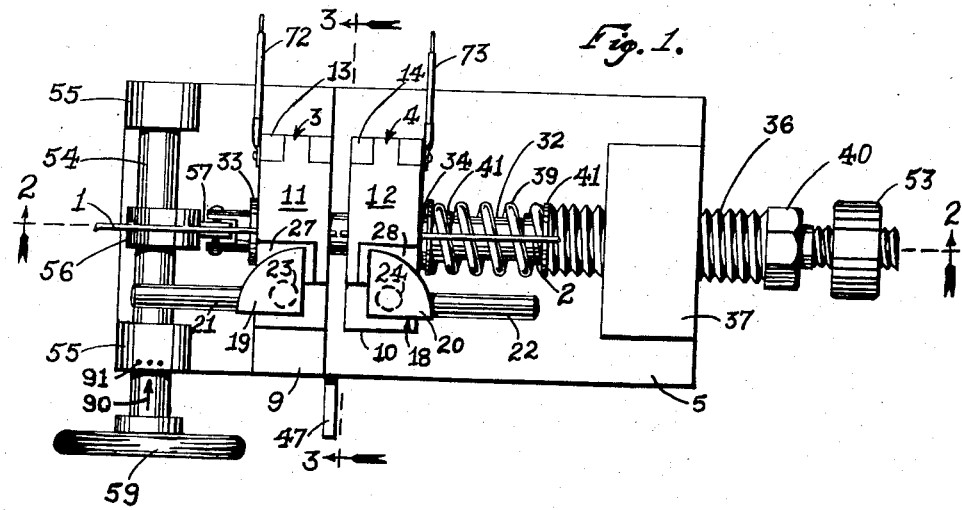

The insulating block 9 supporting the clamp unit 3 is mounted on the base 5 in fixed position. The clamp unit 4 is mounted for movement toward and away from the fixed clamp 3. As illustrated in Figs. 1, 2 and 3, a shaft 32 extends through bushings 33, 34 in aligned holes through the insulating blocks 9 and 10 of the clamping units. The insulating block 10 of the movable clamp 4 is slidable on the base 5 and is fixed by a pin 35 to the shaft 32 which is slidably supported for axial movement by the bushing 33 in insulating block 9 and by a sleeve 36 which is externally threaded and screwed into a threaded hole in a mounting block 37 fixed on the base 5 by stud bolts 38. A compression spring 39 acting between the insulating block 10 and the inner end of the threaded sleeve 36 tends to move the clamp unit 4 toward the fixed clamp unit 3. The force exerted by the spring 39 is adjustable by screwing the threaded sleeve 36 farther into or out of the block 37, the sleeve being preferably provided with a suitable grip or wrench end 40 for this purpose. The spring 39 is guided by bushings 41 which are L-shaped in axial section and engage the ends of the spring.

The clamp unit 4 is movable by the spring 39 from a "cocked" position in which the clamps 3 and 4 are spaced apart and the ends of the two wires held by the clamps are also spaced as illustrated in Figs. 1 and 2 to a released position in which the ends of the two wires are brought together. The clamp 4 is releasably held in cocked position by a detent 43 that extends through a hole in the base 5 and—in operative position—projects between the insulating blocks 9 and 10 of the two clamps thereby holding the clamps apart. A stem 44 on the detent 43 extends out through a hole in a U-shaped bracket 45 and is threaded at its outer end. A compression spring 46 acts between the bracket 45 and a collar 43' on the detent 43 to bias the detent toward its inner or operative position. The detent is retractible to release the movable clamp by means of a trigger lever 47 (Fig. 3) pivotally supported by a bracket 48 on the base 5 and having one end connected to the detent stem 44 by washer 49 and nuts 50. Movement of the outer end of the trigger 47 in the direction of the arrow 51 retracts the detent 43 thereby releasing the clamp 4 for movement toward the clamp 3 by the spring 39. When the clamp 4 is subsequently retracted against the force of its spring 39, the detent 43 springs inwardly to operative position thereby holding the clamp in cocked position.

The clamp 4 is moved to cocked position in any suitable manner for example, by means of a knob 53 on the outer end of shaft 32. However, a feature of the apparatus shown in Figs. 1 to 3 is that power or force multiplying means is provided for moving the clamp 4 to cocked position quickly and easily. A shaft 54 rotatably supported by bearing brackets 55 fixedly carries an eccentric cam 56 that engages a roller 57 provided on the inner end of the shaft 32 carrying the movable clamp 4 and thereby moves the shaft 32 and the affixed clamp 4 in the direction of the arrow 58 (Fig. 2). Suitable means is provided for rotating the shaft 54, such means being illustrated as a hand wheel 59.

The electrical system of the apparatus is shown in Fig. 5 and comprises a condenser 60, means for charging the condenser and means for connecting the condenser with the clamps 3 and 4 holding the wires 1 and 2 so that the condenser is discharged through the wires when they are brought together. The means for charging the condenser 60 comprises a transformer 61 having its primary connected through a voltage divider 62, leads 63 and 64, fuse 65 and off-on switch 66 to a suitable alternating current supply 67 for example a 60 cycle 110 volt line. A signal lamp 68 connected across the leads 63 and 64 indicates when the apparatus is turned on. The secondary of the transformer 61 is connected to the condenser 60 through a rectifier 69, resistance 70 and the contacts of a double throw relay 71. The circuit components including the transformer 61 and voltage divider 62 are selected so as to charge the condenser 60 to a relatively low voltage preferably of the order of 440 volts, the voltage being adjustable by voltage divider 62. This permits the use of inexpensive low voltage condensers for example commercial condensers of the electrolytic type. The capacity of the condenser 60 is selected according to the range of sizes of wires to be welded. It has been found that a condenser having a rating of 400 volts and 1200 microfarads is sufficient for welding wires having a diameter as large as .08 inch. When it is desired to weld larger wires, a larger condenser may be used to provide the amount of energy required for the weld. However, because of the high efficiency of the method in accordance with the invention, it is possible to use a smaller condenser than is required by previous methods. The condenser 60 may comprise one or several units as desired.

The opposite terminals of the condenser 60 are connected respectively to the clamps 3 and 4 holding the wires 1 and 2 by leads 72 and 73, the latter being connected to the condenser through the contacts of relay 71. When the relay is in the position shown in Fig. 5, the condenser 60 is connected to the clamps 3 and 4. When the relay 71 is in the opposite position, the condenser 60 is connected through the rectifier 69 to the secondary of transformer 61 for charging the condenser.

The connections from the condenser to the clamps 3 and 4 are substantially free of inductance and are of as low resistance as is practicable without using excessively large conductors. The contacts of the relay 71 are of high current carrying capacity and low resistance so as to be able to carry high instantaneous current during discharge of the condenser through the wires 1 and 2 when they are brought together.

Relay 71 is controlled by a double throw electrically latching relay 74 having opposed coils 75 and 76. When coil 75 is energized by closing the charging switch 77—preferably a manual push-button switch—the movable contact of relay 74 is moved to the position opposite to that shown in Fig. 5 and the coil of relay 71 is thereby de-energized so that the moving contact of relay 71 moves to its left hand position to close the charging circuit of the condenser 60. At the same time, a light 78 is connected across the power supply and indicates that the condenser 60 is charging. When coil 76 of relay 74 is energized by closing a "welding" switch 80, the movable contact of relay 74 is swung to the position shown in Fig. 5 and thereby energizes the coil of relay 71 and causes its moving contact to swing to its right hand position. This disconnects the condenser 60 from the charging circuit and connects it to the clamps 3 and 4 holding the wires to be welded. The welding switch 80 may be a manual push-button switch but as illustrated in Fig. 3, it is a microswitch actuated by the trigger 47 for releasing the movable clamp 4. When the movable clamp is released by actuation of the trigger 47, the switch 80 is closed so that the condenser is connected to the clamps 3 and 4 as described above. This contributes to the safety of the apparatus since the clamps 3 and 4 have no voltage applied to them until the instant the trigger 47 is actuated to effect a weld.

A further safety feature of the apparatus is the provision of means for discharging the condenser 60 in the event the off-on switch 66 is opened or the unit is disconnected from the power supply when the condenser is charged. The coil of a single-throw relay 82 is connected across the power supply leads 63 and 64 so that the relay is energized and held in open position whenever the power is on. When the power is turned off, relay 82 closes to connect a resistance 83 across the terminals of the condenser 60. The condenser is thereby discharged through the resistance 83. Moreover, since relay 71 is de-energized, the condenser cannot be connected to the clamps 3 and 4.

*Method*

In butt welding two wires in accordance with the invention, the end faces of the wires are prepared to provide surfaces that are substantially parallel but have projecting portions which provide initial point contact when the members are brought together. The end surfaces of the two wires should be sufficiently smooth and sufficiently parallel to one another that they can be brought into intimate contact throughout their area with a minimum amount of force and without melting more than minute portions of the material. The melting of the material requires energy and hence the more material that must be melted reduces the efficiency of the method. It is hence desirable to avoid sharp V-shaped ends on the wires. On the other hand, the end faces of the wires should be rough enough to provide initial point contact when the ends are brought together, the term rough being herein used to designate any deviation from flat parallel surfaces that will provide substantially point contact. The required roughness can be provided in several different ways. As illustrated in Figs. 7 and 8, the end faces 85 of the wires 1 and 2 are embossed to provide alternate peaks and valleys arranged in a waffle pattern. The embossing is conveniently effected by clamping the wires in clamps 3 and 4 of the apparatus shown in Figs. 1 to 4, with the electrical current turned off, and releasing the spring pressed movable clamp to cause the ends of the wire to strike an embossing tool held between the two ends. Alternatively, the ends of the wire can be roughened by means of a tool having a plurality of points like the wire end shown in Fig. 8 by holding the tool in engagement with the end face of the wire and producing relative rotation about an axis offset from the axis of the wire. This produces a series of arcuate scratches on the end face of the wire. A third method is to cut the wires with faces slightly inclined to a plane perpendicular to the axis of the wire, the angle of inclination being less than 5 degrees and preferably of the order of 2 degrees. When the wires are brought together for welding, they are oriented so that their faces are not quite parallel and hence meet with point contact.

The roughness of the end faces of the wires should be of the order of 100 to 200 micro-inches root mean square value as measured by a profilometer. A value of the order of 150 micro-inches is preferred. The peak to valley depth is preferably of the order of .01 inch. If the faces are too rough, the wire ends cannot be brought into sufficiently intimate contact during the extremely short welding period to produce a satisfactory weld.

The two wires to be welded with end faces prepared as described above, are clamped in the clamps 3 and 4 of the apparatus illustrated in Fig. 2, the movable clamp being held in cocked position by the detent 43. The ends of the wires are spaced apart a predetermined distance. This is conveniently done by means of a feeler gauge, one of the wires being secure in its clamp and the other wire being adjusted to provide the proper spacing before its clamp is tightened. A still more convenient way of spacing the wire ends with the apparatus shown consists of turning the hand wheel 59 to move the clamp 4 part way toward cocked position, clamping the wires in abutting relation and then completing the cocking of the apparatus. The spacing is determined by the relative position of clamps 3 and 4 when the wires are clamped. The slope of the cocking cam is such that the cam and hand wheel will stay in the position to which they have been turned. Preferably an index 90 and scale 91 are provided on relative moving parts to provide convenient calibration of the spacing.

The spacing is selected to provide the proper velocity of approach of the wire ends when the movable clamp is released. The velocity depends on the force exerted by the spring 39, the weight of the moving clamp unit 4 and the distance the clamp travels i. e. the spacing of the wire ends. If the velocity is too high, the wire ends are jammed together before the metal is sufficiently heated to produce a good weld. If the velocity is too low, the heat is dissipated and the ends have cooled before they are completely brought together. Moreover, with too low a velocity, the ends of the wire are not brought together with sufficient force. While there appears to be a melting of minute portions of the material on the ends of the wire, other portions of the ends are merely softened without being melted so that the weld is essentially a forge weld rather than a fusion weld. It is hence important that the wires be brought together with as high a force as possible without buckling the ends or causing them to "mushroom." With the wire ends roughened to the degree indicated above, it has been found that excellent welds of aluminum wire having a diameter of .08 inch can be obtained with a spring force of 90 pounds, a moving mass of approximately 1 pound and an initial wire gap of .037 inch. If the force of the spring is decreased, the spacing should be correspondingly increased according to the formula $$S_2 = \frac{S_1 F_1}{F_2}$$

where $S_1$ is the spacing corresponding to a spring force of $F_1$ and $S_2$ is the spacing with a spring force of $F_2$, the mass of the moving clamp being considered constant. However, it has been found undesirable to use a spacing of more than .25 inch. If larger wires are to be welded, it is desirable to increase the mass of the moving clamp and correspondingly increase the force exerted by the spring 39 so as to keep the velocity at the instant of contact substantially constant. The mass of the moving clamp can be conveniently varied by using interchangeable knobs 53 of different weights on the outer end of the shaft 32 (Figs. 1 and 2).

With the wires 1 and 2 clamped in place, the condenser 60 is charged by pressing the charging switch 77. If desired to save time, the condenser can be charged while the wires are being clamped since the condenser is not connected to the clamps 3 and 4 until the welding switch 80 is closed. However, the charging of the condenser after the wires are clamped provides a further safety factor. The trigger 47 is thereupon actuated to close the welding switch 80 to connect the charged condenser to the clamps 3 and 4 and to withdraw the detent 43 to release the movable clamp 4. The clamp 4 is thereupon moved toward the fixed clamp 3 at an accelerating rate by the force of the spring 39. As the ends of the wires come into engagement with an initial point contact, the condenser discharges through the wires. By reason of the extremely small area of the initial contact, the contact resistance is relatively high and produces highly concentrated heating. The useful energy producing heat in the weld area is represented by the equation:

$$E_c = I^2 R_c$$

where $E_c$ is the useful energy at the point of contact of the wires, I is the current and $R_c$ is the contact resistance of the wires. At the same time, energy is being dissipated and thus wasted by reason of unavoidable resistance in the leads between the condenser 60 and the wires, the dissipated energy being represented by the equation:

$$E_d = I^2 R_d$$

where $E_d$ is the wasted energy, I is the current and $R_d$ is the resistance of the leads. In the method according to the invention, high efficiency is obtained by maintaining a high ratio of $E_c/E_d$. This is achieved by using low resistance leads to decrease the value $R_d$ and by corelation of the surface preparation of the wire ends and the velocity at which the ends are brought together to obtain a relatively high value of $R_c$. In this way, more than 50% of the energy stored in the condenser is used for heating the wire end faces in the welding operation, values as high as 80% being obtained by paying careful attention to correct preparation and spacing of the wire ends. If the wire ends are not properly prepared and properly spaced, the percentage of useful energy utilized in the weld will be lower but should not be permitted to drop below 30% of the energy stored in the condenser if a satisfactory weld is to be produced.

The heat produced upon contact of the wire ends with one another heats and softens the ends of the wire and may melt minute portions of the material. A small amount of melting is desirable when welding easily oxidized materials such as aluminum as it breaks up the oxide coating. However, excessive melting and splattering of the material represents a waste of energy and is to be avoided. As the wires continue to move toward one another, the initial points of contact are flattened or melt down permitting additional areas to come into contact with one another. The total area of contact is thereby progressively increased. This is desirable because the voltage of the condenser progressively decreases as the condenser discharges. The progressive decrease in the contact resistance of the wires results in maintaining a high current value despite the decreasing voltage. As the heating effect produced varies with the square of the current, it is important that a high current value be maintained. In this connection, it will be noted that the leads connecting the condenser 60 with the clamps 3 and 4 are free of inductance so that the flow of current is not "choked." The heating of the wire ends continues as the higher areas are melted or softened and fresh areas are brought into engagement. The velocity with which the ends of the wire are brought together is such that at the instant the end faces are heated throughout, they are forcibly jammed together to produce a forged weld. While the heating and ultimate jamming of the ends has been described as a progressive action, it actually takes place in an extremely short interval of time, namely an interval less than .01 second and preferably of the order of .0003 second. There is hence insufficient time for the loss of any substantial amount of energy by radiation, conduction or convection. This has two important results. It increases the efficiency of the welding operation making it possible to weld relatively large wires with a small amount of energy. It also improves the quality of the weld since the material adjacent the weld faces is not heated enough to have any deleterious effects. The welds produced in accordance with the invention are of such high quality that a welded aluminum wire having a diameter of .08 inch can be bent 180° at the weld without breaking and can be drawn to a diameter of .013 inch without rupturing. This clearly indicates that ductility in the weld zone is preserved and the joint efficiency is extremely high.

*Gun type welder*

In Figs. 11 and 12 there is shown a gun type welder which is particularly adapted to butt weld a wire to a larger member. For example, in Fig. 9 a wire 102 is shown welded to the end face of a rod 101 while Fig. 10 illustrates welding a wire to the side of a rod. The apparatus of Figs. 11 and 12 is similar in construction and operation to that of Figs. 1 to 4 and corresponding parts are designated by the same reference numerals with the addition of 100. The apparatus comprises a work support 103 adapted to rest against the larger member for example the rod 101 of Fig. 9 and a movable clamp 104 for the wire 102. The work support 103 is fixed on a frame or stock 105 having a handle portion 106 while the clamp 104 is movable longitudinally on the stock 105. The movable clamp 104 comprises a lower jaw 108 mounted on an insulated block 110 and an upper jaw 112 swingably connected to the lower jaw by hinge mounting 114 and held in closed position by means of a quick acting locking device 118 comprising a segmental latch member 120 swingable by means of a handle 122 on a pivot post 124. The latch member 120 engages an inclined cam surface 128 provided on the upper face of the upper jaw 112 to force the upper jaw downwardly and lock it in position to clamp a wire between the two jaws which are preferably provided with one or more grooves to receive and position the wire.

The construction and operation of the movable clamp and associated parts for effective movement of the clamp can be the same as in Figs. 1 to 4. However, as illustrated in Figs. 11 and 12, the movable clamp 104 is slidable on a shaft 132 which extends through a bushing 134 in a hole through the insulating block 110 and is shrunk fitted or otherwise fixed at one end in a hole in the work support 103, the other end of shaft 132 being slidably received in an aligned sleeve 36 which is externally threaded and screwed in a threaded hole in a mounting block 137 projecting upwardly from the rear end portion of the stock 105. A compression spring 139 acts between the insulating block 110 of the clamp 104 and the inner end of the threaded sleeve 136. The force exerted by the spring is adjustable by screwing the sleeve 136 farther into and out of the block 137 by means of a suitable knob or handle 140. The spring 139 is guided by bushings 141 at the ends of the spring.

The clamp 104 is movable by the spring 139 from a "cocked" position in which the forward face of the clamp 104 is spaced rearwardly from the plane of the forward face of work support 103 to a released position in which the end of a wire held by clamp 104 engages a work member against which the support 103 is held. The clamp 104 is releasably held in cocked position by a detent 143 that extends through a hole in the stock 105 and—in operative position—projects between the work support 103 and the insulating block 110. A stem portion 144 of the detent 143 extends out through a hole in a cover 145 removably fixed on the under side of the stock 105. A compression spring 146 acts against a collar 143' on the detent to bias the detent toward its inner position as shown. The detent 143 is retractible to release the movable clamp by means of a trigger lever 147 pivotally supported on the stock at 148 and connected to a cam bar 149 having a cam surface 150 engaging a cooperating cam surface on the stem portion 144 of the detent. Movement of the trigger 147 in the direction of the arrow 151 retracts the detent 143 thereby releasing the clamp 104 for movement by the spring 139. A spring 152 on a guide pin 152' restores the trigger to its normal forward position. While the shaft 132 can be made slidable and provided with a knob like the knob 53 of Figs. 1 and 2 for cocking the apparatus, it has been found satisfactory merely to place the clamp 104 against a suitable support and push forwardly on the handle 106 to move the clamp to cocked position. The detent 143 springs inwardly to hold the clamp.

The apparatus of Figs. 11 and 12 employs the same electrical system as described above. The electrical components are preferably housed in a separate small cabinet and connected to the welding apparatus by a flexible cable containing the required leads. This arrangement makes the equipment readily portable and easy to use. It also permits using the same electrical unit interchangeably with the "bench" type equipment shown in Figs. 1 and 2 or the gun type shown in Figs. 11 and 12. The leads 172 and 173 shown in Figs. 11 and 12 correspond to the leads 72 and 73 in Fig. 5, lead 172 being provided with a clip 172' for connecting it to the work and lead 173 being connected to the movable clamp 104. A switch 180 corresponds to switch 80 of Fig. 5 and is actuated to energize relay coils 76 and 71 to connect the condenser 60 to the outward leads 172 and 173. Instead of having the switch 180 actuated by the trigger as in the embodiment of Figs. 1 to 4, the switch 180 is shown as being of the push-button type and is mounted in the rear upper portion of the handle 106 in a position to be pushed by the operator's thumb. This provides an added safety factor in that the operator must both push the button of the switch 180 and squeeze the trigger 147 to effect a weld. Until the switch 180 is closed, no voltage is applied to the leads 172 and 173.

The operation of the apparatus of Figs. 11 and 12 is essentially the same as that of Figs. 1 to 4. The wire 102 is secured in the clamp 104, being adjusted to provide a predetermined space between the end of the wire 102 and the member to which it is to be welded. The operator then presses the gun firmly against the work, pushes switch button 180 and squeezes trigger 147 to make a weld. The manner in which the weld is effected is the same as described above. The knob 140 and handle 106 provide convenient means for holding the gun firmly.

It will be understood by those skilled in the art that the invention is in no way limited to the preferred embodiments herein shown and particularly described and that modifications may be made without departing from the spirit and scope of the invention.

What we claim and desire to secure by Letters Patent is:

1. A method of electrical resistance butt welding, which comprises preparing surfaces of two members to be welded to provide faces that are substantially parallel but with projecting portions providing initial point contact when said members are brought together, positioning said members in predetermined spaced apart relation, exerting on said members a force tending to move them together, restraining said members against movement, electrically connecting said members respectively through a low impedance external circuit to opposite sides of a charged condenser and releasing said members for movement by said force, the configuration of said surfaces, the spacing of said members and the force applied to them being correlated to provide an electrical resistance between said members on initial contact greater than that of said external circuit and a decreasing contact resistance as the members continue to move toward one another and thereby bring larger areas into contact, the instantaneous discharge of said condenser through said contact resistance between said members producing concentrated localized heat to soften only said faces, and to provide an impact at the end of such movement sufficient to produce a weld between the softened faces of said members.

2. A method according to claim 1, in which the voltage to which said condenser is charged does not exceed 450 volts.

3. A method according to claim 1, in which at least one of said members is a wire and the spacing of said members prior to release does not materially exceed the diameter of said wire.

4. A method according to claim 1, in which the spacing of said members prior to release is of the order of .01 to .25 inch.

5. A method according to claim 1, in which said faces have a roughness of the order of 100 to 200 micro-inches root mean square value.

6. A method according to claim 1, in which said faces are roughened by a rotating tool producing arcuate scratches on said faces.

7. A method according to claim 1, in which said faces are embossed to provide alternate peaks and valleys.

8. A method according to claim 1, in which said faces are slightly inclined relative to one another, the angle of inclination being of the order of 1° to 5°.

9. A method according to claim 1, in which at least 30% of the energy stored in said condenser is used for heating said faces in the welding operation.

10. A method according to claim 1, in which said condenser is connected with said members by substantially inductance-free low resistance connections.

11. A method of electrical resistance butt welding which comprises preparing surfaces of two members to be welded to provide welding faces that are substantially parallel to one another but with minute projecting portions providing initial point contact when said faces are brought together, positioning said members with said faces in predetermined spaced apart relation, electrically connecting said members respectively through low impedance leads to opposite sides of a condenser charged to a voltage of the order of 400 volts, and moving said members toward one another with progressively increasing velocity to bring said faces together with a single impact, the configuration of said faces, the spacing of said members and the velocity at which said faces are brought together being correlated to provide an electrical resistance between said members on initial contact of said faces greater than that of the connections between said members and said condenser and a decreasing contact resistance as the members continue to move toward one another and thereby bring larger areas into contact, the instantaneous discharge of said condenser through said contact resistance between said faces producing concentrated localized heat to soften only said faces, and to produce an impact force at the end of such movement sufficient to effect a weld between the softened faces of said members without material upset of said members back of said faces.

12. A method of electrical resistance butt welding which comprises preparing surfaces of two members to be welded to provide welding faces that are substantially parallel to one another but with minute projecting portions providing initial point contact when said faces are brought together, securing one of said members to a fixed support, securing the other of said members to a selected mass movable toward said support, exerting a selected force on said mass in a direction to move it toward said support, restraining said mass against movement by said force to hold said mass in selected position with the weld faces of said members facing one another and spaced a predetermined distance apart, electrically connecting said members respectively through low impedance leads to opposite sides of a charged condenser and releasing said mass for movement by said force to bring said faces together with a single impact, the configuration of said surfaces, the initial spacing of said members, the value of said mass and the force applied to said mass being correlated to provide electrical resistance between said members on initial contact of said faces greater than that of the connections between said members and said condenser and a decreasing contact resistance as the members continue to move toward one another and thereby bring larger areas into contact, the instantaneous discharge of said condenser through said contact resistance between said face producing concentrated localized heat to soften only said faces, and to produce an impact force at the end of such movement sufficient to effect a weld between the softened faces of said members without material upset of said members back of said faces.

13. A method of electrical resistance butt welding which comprises preparing surfaces of two members to be welded to provide welding faces that are substantially parallel to one another but with minute projecting portions providing initial point contact when said faces are brought together, positioning said members with said faces substantially parallel to one another and spaced a selected distance apart, electrically connecting said members respectively through low impedance leads to opposite sides of a charged condenser and moving said members toward one another at a selected velocity to bring said faces together with a single impact, the configuration of said faces, the spacing of said members and the velocity at which said faces are brought together being correlated to provide an electrical resistance between said members on initial contact of said faces gerater than that of the connections between said members and said condenser and a decreasing contact resistance as the members continue to move toward one another and thereby bring larger areas into contact, the instantaneous discharge of said condenser through said contact resistance between said faces producing concentrated localized heat to soften only said faces, and to produce an impact force at the end of such movement sufficient to effect a weld between the softened faces of said members without material upset of said members back of said faces.

References Cited in the file of this patent

UNITED STATES PATENTS

| | | |
|---|---|---|
| 1,066,468 | Chubb | July 8, 1913 |
| 1,109,592 | Morgan | Sept. 1, 1914 |
| 1,155,426 | Liebmann et al. | Oct. 5, 1915 |
| 1,877,874 | Hopkins | Sept. 20, 1932 |
| 2,018,379 | Pfeiffer | Oct. 22, 1935 |
| 2,049,312 | Palmer | July 28, 1936 |
| 2,115,707 | Crecca et al. | May 3, 1938 |
| 2,256,480 | Hughes | Sept. 23, 1941 |
| 2,315,093 | Languepin | Mar. 30, 1943 |
| 2,319,763 | Humphrey | May 18, 1943 |
| 2,332,581 | Kohler | Oct. 26, 1943 |
| 2,375,229 | Klemperer | May 8, 1945 |
| 2,419,749 | Weinhardt et al. | Apr. 29, 1947 |
| 2,777,046 | Vang | Jan. 8, 1957 |